July 29, 1924.
H. L. FURR
SIGNAL OPERATING MEANS
Filed April 10, 1924 2 Sheets-Sheet 1
1,503,040
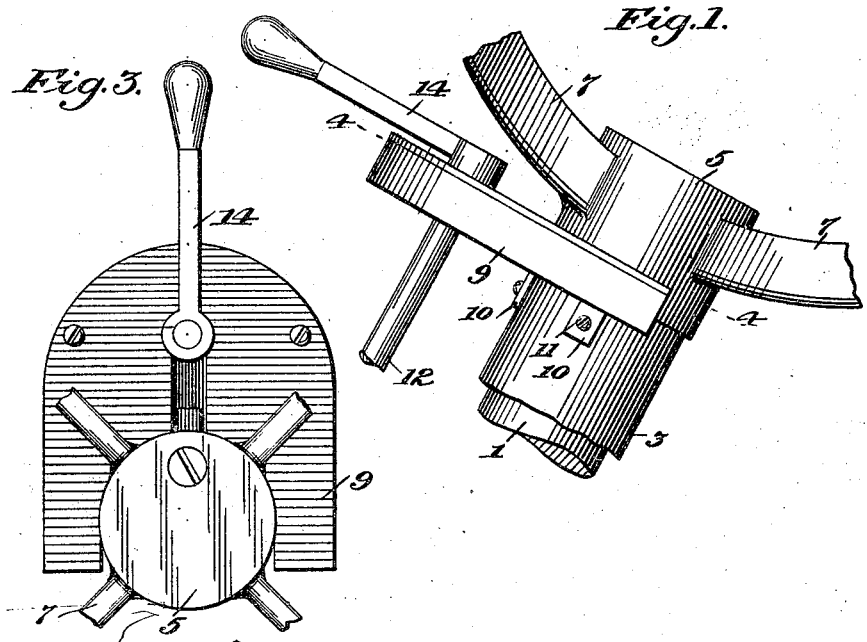
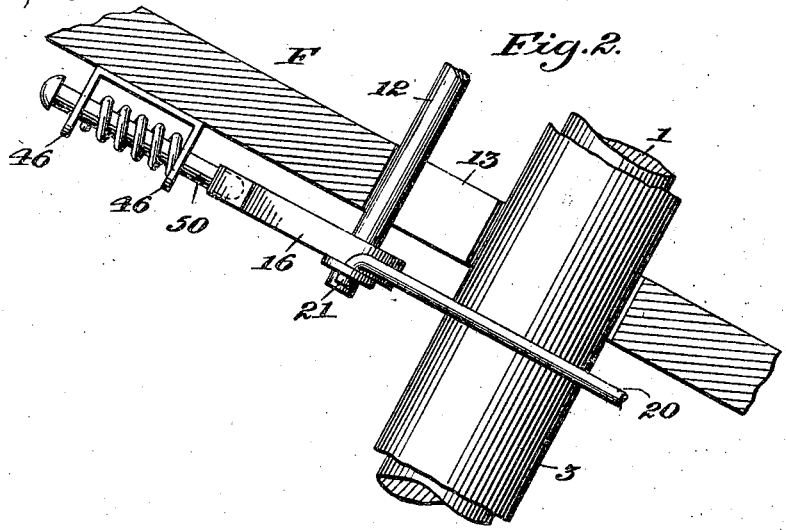
Inventor:
Harry L. Furr,
by C. A. Mason Atty.

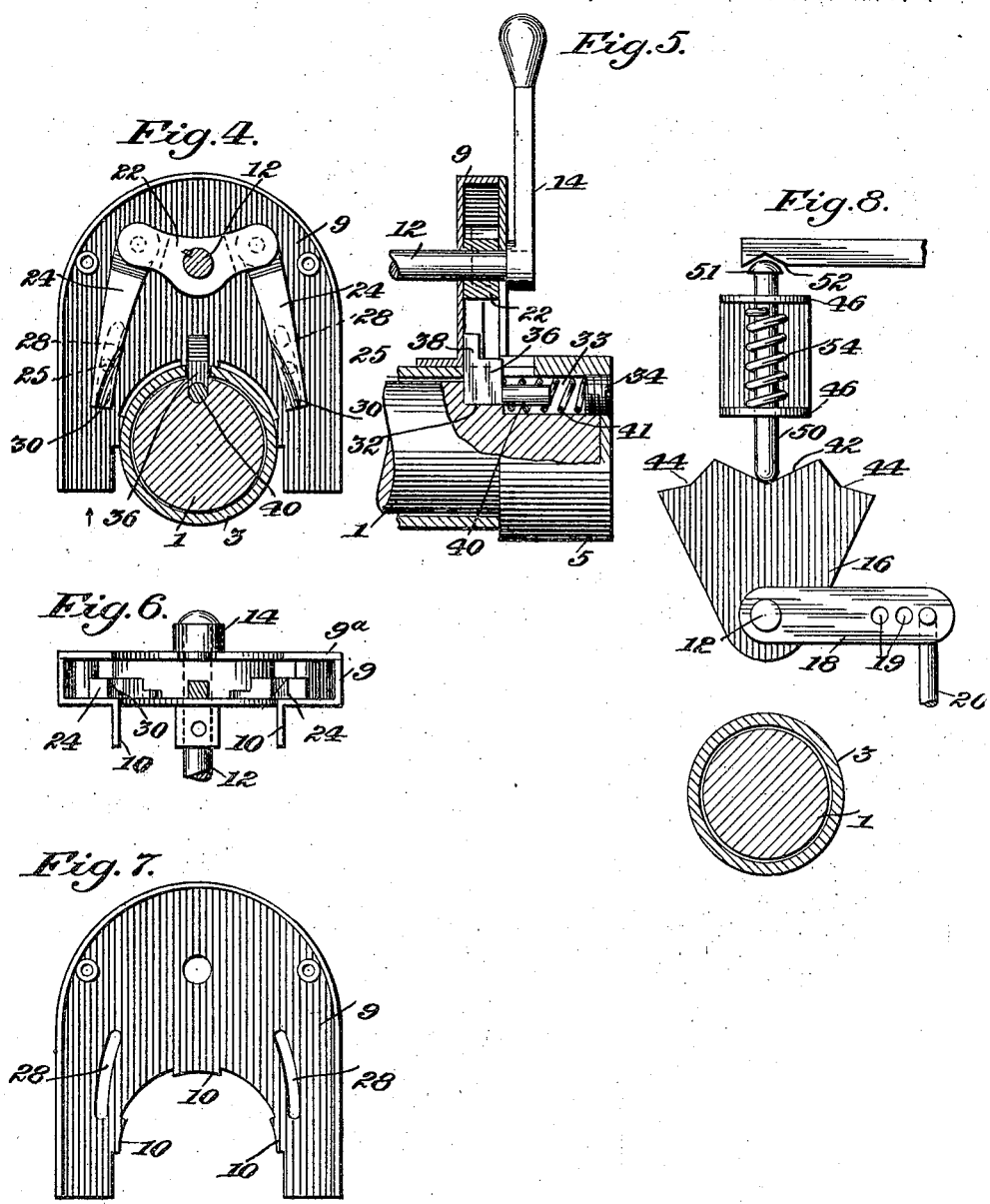

Patented July 29, 1924.

1,503,040

UNITED STATES PATENT OFFICE.

HARRY L. FURR, OF HARRISONBURG, VIRGINIA.

SIGNAL-OPERATING MEANS.

Application filed April 10, 1924. Serial No. 705,460.

*To all whom it may concern:*

Be it known that I, HARRY L. FURR, a citizen of the United States of America, residing at Harrisonburg, in the county of Rockingham and State of Virginia, have invented certain new and useful Improvements in Signal-Operating Means, of which the following is a full, clear, and exact description.

This invention has relation to means for operating signals, and more particularly to devices for operating an indicator on a motor vehicle to show the direction in which the vehicle is about to turn towards one side or the other.

The invention comprises as an important feature simple and positively operating means which is mounted on the steering wheel of the motor vehicle, and arranged to be controlled by the driver of the vehicle in advance of a turning movement to the right or to the left, for setting a signal to indicate to a following vehicle the direction of such turning movement. In connection with such means for setting the signal, the invention also comprises as an important feature, means whereby the steering post of the vehicle will restore the signal to neutral position when said steering post is turned in a direction to cause the vehicle to move in a substantially straight direction.

Other features of the invention, such as important details of construction and combinations of parts, will be better understood from the following description, in connection with the accompanying drawings which latter illustrate one form of the invention, and wherein, Fig. 1 is a view showing the upper portion of a steering post, and the casing containing the signal-actuating mechanism, in side elevation;

Fig. 2 is a view showing a portion of the steering column extending through the platform of the car, and a circuit closing mechanism for a signal light;

Fig. 3 is a plan view of Fig. 1;

Fig. 4 is a view in horizontal section on the line 4—4, Fig. 1;

Fig. 5 is a partly sectional view taken through Fig. 4, the plane of section being at right angles to that of Fig. 4;

Fig. 6 is a front view of the casing and controlling mechanism looking in the direction of the arrow, Fig. 4, with the steering column removed;

Fig. 7 is a plan view of the casing for the mechanism, and Fig. 8 is a detail view of the parts shown in Fig. 2, with the floor board removed.

Referring to Fig. 1, the usual steering post 1 of a motor vehicle is shown as surrounded by a tube 3, and the hub 5 of the steering wheel is mounted upon the upper end of said post, the hub having the usual radial spokes 7, which support the steering wheel.

The lower portion of the hub 5 is partly surrounded by a box or casing 9, herein shown as having a plurality of downwardly projecting lugs 10 through which pass screws 11, which screws likewise enter the tube 3 whereby the casing is supported from said tube. Extending through apertures in the rear portion of the body and lid of the casing 9 is a control rod 12 to the upper end of which is fixed a handle 14 which projects rearwardly beyond the box and is located in a convenient position below the steering wheel for manipulation. The rod 12 extends downwardly through an opening 13 in the floor board F of the motor vehicle, the lower end portion of the rod being rigidly fastened to a crank arm 18, herein shown as provided with a series of holes 19, any one of which may receive the bent end 21 of a rod or wire 20. The wire 20 forms a connection between the signal-setting mechanism, comprised by the rod 12, handle 14, and crank arm 18, and the signal for indicating the direction in which the vehicle is to be turned. Such signal may be of any approved design, as for example, it may be in the form of an arrow to be pivotally supported upon one of the rear fenders of the motor vehicle and may point upwards when in neutral position. When the setting mechanism is operated by turning the handle 14 to the right, for example, through the described connections the signal arrow will be moved from neutral position 90° in a direction to point to the right thereby indicating to a following vehicle that the vehicle carrying the signal is about to make a right-hand turn. The same would be true prior to making a left-hand turn if the operating handle 14 were turned to the left as this would cause the signal to be turned from a neutral position into one in which it pointed to the left-hand side of the vehicle.

The principal features of this invention are concerned with the mechanism for restoring the signal to neutral position after it has, through the manually operated setting device described, been moved so as to point to the right, or to the left, prior to the turning of the vehicle in either one of these directions. Such restoring mechanism is automatically operated through connections actuated by the steering post when the same is moved reversely to its direction of movement to effect the turn of the vehicle to the right, or to the left. In the present instance these connections comprise operating parts which are enclosed in the box 9 and are of such a nature as to act positively and reliably without the use of springs or other yielding devices, and whereby the signal is not restored to neutral position until the steering wheel has been reversed to cause the vehicle to move straight ahead.

Referring to Fig. 4, the rod 12 has keyed or otherwise rigidly secured to it, a bar or cross piece 22, to the opposite ends of which are pivoted two arms 24, 24. Each of the arms 24 is provided with a downwardly projecting pin 25 which moves in an inclined slot 28 at the bottom of the box 9, the position of these slots being such that when the bar 22 is moved through the rod 12 to advance either of the arms 24, such arm will be caused to move inwardly towards the post 1 so that at the completion of its advance movement it will lie close to the tube 3. Each arm is provided on its inner side with a bevel 30 for a purpose to be hereinafter described.

The steering post 1, see Fig. 5, is provided with a recess 32 which communicates with a circular bore 33, parallel with the longitudinal axis of the steering post and which leads from the recess outwardly through the upper end of the hub 5, where it is closed by a screw plug 34. A pawl 36, provided with a nose 38, is fitted to reciprocate in the recess 32, said pawl having a pin 40 projecting from its upper portion, a spiral spring 41 surrounding the pin, and having its opposite ends confined between the pawl 36 and the screw plug 34, whereby the pawl is normally pressed to the bottom of the recess 32. The nose 38 projects through a slot in the tube 3, and into the central portion of the box 9. When the steering post is rotated to the left, for instance, to cause the vehicle to move in that direction the nose 38 is moved around until it reaches the inclined or beveled surface 30 of the arm 24, which arm had been previously advanced when the signal was set to indicate a left-hand turn. The nose will be carried up the inclined face until it reaches the end of the arm, and further movement of the post will cause the nose to be carried beyond the end of the arm when the spring 41 will snap the nose over the end of the arm. Upon a reverse movement of the steering post to cause the vehicle to go straight ahead the nose 38 will engage the end of the arm and restore the latter and the bar 22 to the position shown in Fig. 4, which action will result in setting the signal to a neutral position. As the arm 24 is carried back by the nose 38 the engagement between the pin 25 and slot 28 will effect an outward swinging of the arm until it clears the nose, and when the parts are in neutral position each arm 24 will be free from engagement with the tube 3, the ends of the arms being then spaced a slight distance from the tube, as shown in Fig. 4. In turning the vehicle to the right, obviously the handle 14 will be moved in an opposite direction from that above described, to advance the other arm 24 while the signal is being set in position to point to the right. When the steering wheel is moved to cause the vehicle to turn, the lug 36 and nose 38 will of course be rotated to cause the nose to move up the inclined face 30 of the arm 24 which was advanced when the signal was set, and after the nose has cleared the end of the arm, upon reverse rotation of the steering wheel said nose will restore the arm and, through the described connections, the signal will be restored to neutral position, as before described with reference to a left-hand turn of the vehicle.

Referring to Fig. 8, a cam 16 is rigidly secured to the lower end portion of the rod 12, said cam having a central depression 42, and two depressions 44, 44, which are respectively located upon opposite sides of the depression 42. A rod 50, which is suitably guided in aligned openings through two spaced plates 46 of a bracket secured beneath the floor bottom F, has one of its ends positioned to enter any one of the depressions 42, 42, the opposite end 51 of the rod constituting an electrical contact adapted for engagement with another contact 52. These contacts have suitable wire connections with an electrical lamp in the signal, and are arranged to complete a circuit through said lamp when the signal is turned to the right, or to the left, for indicating a movement of the vehicle in either of said directions. A spiral spring 54 is connected with the pin 50 and one of the plates 46 and holds the lower end of the pin in yielding engagement with the edge of the cam 16, the tendency of said spring being to urge the pin in a direction to maintain the contacts 51, 52 apart. The recess 42 is deeper than the recesses 44, 44, and when the signal is in neutral position the end of the pin 50 rests on the low part 42 of the cam thus holding the contacts separated so that the lamp in the signal will not glow. When, however, the signal is turned either to the right or to the left, the lower end of the pin 50 will occupy one of the recesses 44 which are not sufficiently deep to permit separation of the contacts 51, 52, so that the circuit will be completed through the lamp in the signal. It will be seen that the lamp will be caused to glow, therefore, only when the signal is turned to either side of its neutral position.

The parts just described not only perform the function of controlling the current through the light so as to cause it to glow when the signal is turned from neutral position, but said parts also perform another function, viz, to frictionally hold the signal in any one of its three positions. While the friction between the pin 50 and the recesses in the cam 16 is not sufficient to prevent operation of the signal, sufficient resistance to movement is caused by the cam to prevent the signal from being moved by the vibration of the car, and to permit it to be moved only when the handle 14 is actuated, or the arms 24 are moved by the pawl 36.

From the foregoing it will be clear that the device possesses a very few number of parts, that such elements or parts are simple in their construction, and the signal restoring mechanism is positive in its action, that no springs are employed, and the device is of such a nature that it may be enclosed in a small casing which can be so located relative to the steering post as to attract no attention, and that it will not interfere with the operation of any of the usual controlling devices for the motor vehicle.

It is to be understood that the invention is not necessarily restricted to the exact details of construction or arrangement of the parts herein illustrated, as these may be varied within the limitations of the invention as defined by the terms of the following claims, without departing from the principles of the invention.

Having thus described my invention what I claim as new and desire to secure by Letters Patent of the United States is:

1. In a signal operating device for motor vehicles, the combination of means manually controlled for setting a signal, connections, including two movable members, and a device carried by the steering mechanism and arranged to engage one of said members to restore the signal to neutral position when said mechanism is moved in a direction to cause the vehicle to proceed straight ahead.

2. In a signal operating device for motor vehicles, the combination of manually operable means for setting a signal, mechanism, including two pivoted arms having connection with said means, and a device carried by the steering post and arranged, through engagement with one of said arms when the post is rotated reversely from a direction to cause the vehicle to make a turn for restoring said signal to neutral position.

3. In a signal operating device, means, including a part for manipulation by the operator to set a signal for indicating the direction in which a vehicle will turn, connections with said means including a cross bar and arms pivoted to said bar, and a device carried by the steering post and constructed to pass either of said arms when the post is rotated in a direction to cause the vehicle to turn, but to engage with one of said arms when the post is reversely rotated to thereby restore the signal to neutral position.

4. In a signal operating device for motor vehicles, the combination of signal setting means including a rod and a manually operable device therefor, a bar fast to said rod, arms pivotally supported from the ends of said bar, said arms having inwardly beveled faces, a pawl carried by the steering post and arranged when the post is rotated in one direction to be moved over the beveled portion of one of said arms, yielding means for forcing said pawl over the end of the arm whereby a reverse rotation of said post will restore the arm to its original position through engagement of the pawl therewith to thereby effect movement of the signal into neutral position.

5. In a signal operating device for motor vehicles, the combination of manual means for setting the signal including a rod and a handle, a casing located beneath the steering wheel through which said rod passes, a cross bar secured to the rod, arms pivoted to said cross bar, said arms having beveled portions, guiding means for said arms to cause them to move inwardly as said bar is turned to move either of said arms forward, a spring-pressed pawl carried by the steering post and arranged when said post is rotated to engage the inclined face of one of said arms and to move in front of the end of said arm, said pawl upon reverse rotation of the steering post adapted to move the arm rearwardly for restoring the signal to neutral position.

6. In a signal operating device for motor vehicles, means for setting the signal, including a manually operable rod arranged in proximity to the steering post of the vehicle, a cross bar carried by said rod, arms pivotally supported from the ends of said bar, each of said arms provided with a beveled face, means for guiding said arms to cause them to move inwardly toward the steering post as they advance, the steering post of the vehicle being located between the ends of said arms, a spring-pressed pawl mounted to reciprocate in a recess in the steering post and arranged when the post is rotated to engage the move up an inclined face of one of said arms until said pawl passes beyond the end of said arm, whereby upon reverse rotation of the steering post said arm will be moved backwardly to restore the signal to neutral position.

In testimony whereof I have hereunto set my hand this third day of April, A. D. 1924.

HARRY L. FURR.